United States Patent
Kim et al.

(10) Patent No.: US 6,829,213 B2
(45) Date of Patent: Dec. 7, 2004

(54) OPTICAL RECORDING AND/OR REPRODUCING APPARATUS AND HEAD THEREOF

(75) Inventors: Young-Sik Kim, Yongin (KR); Jin Yong Kim, Seongnam (KR); Soo Kyung Kim, Seoul (KR)

(73) Assignee: LG Electronics Inc., Seoul (KR)

(*) Notice: Subject to any disclaimer, the term of this patent is extended or adjusted under 35 U.S.C. 154(b) by 97 days.

(21) Appl. No.: 10/304,138

(22) Filed: Nov. 26, 2002

(65) Prior Publication Data

US 2003/0099189 A1 May 29, 2003

(30) Foreign Application Priority Data

Nov. 27, 2001 (KR) ................................ 10-2001-0074345

(51) Int. Cl.[7] ............................................. G11B 7/135
(52) U.S. Cl. ....................................................... 369/300
(58) Field of Search ........................................... 369/300

(56) References Cited

U.S. PATENT DOCUMENTS

| | | | |
|---|---|---|---|
| 5,729,393 A | * 3/1998 | Lee et al. | 359/819 |
| 6,084,846 A | * 7/2000 | Jordache et al. | 369/112.23 |
| 6,288,875 B1 | * 9/2001 | Budde | 360/245.3 |
| 6,582,630 B2 | * 6/2003 | Jain et al. | 264/1.1 |

* cited by examiner

Primary Examiner—George J. Letscher
(74) Attorney, Agent, or Firm—Lee Hong Degerman Kang & Schmadeka

(57) ABSTRACT

In an optical recording/reproducing apparatus, and in particular to a head of an optical recording/reproducing apparatus, the optical recording/reproducing apparatus includes a slider at which an objective lens is installed at a top surface of the slider and a solid immersion lens (SIL) installation hole formed below the objective lens penetrates toward to the bottom surface of the slider in order to install a SIL; a flying device fixedly installed around the SIL installation hole at the bottom surface of the slider in order to lift the slider above an optical recording medium; wherein a sectional area of the slider parallel to a surface of the optical recording medium increases from the bottom surface to the top surface.

20 Claims, 5 Drawing Sheets

OPTICAL RECORDING AND/OR REPRODUCING APPARATUS AND HEAD THEREOF

BACKGROUND OF THE INVENTION

1. Field of the Invention

The present invention relates to an optical recording/reproducing apparatus, and in particular to a head of an optical recording/reproducing apparatus.

2. Description of the Prior Art

As a recording medium for storing a large amount of data, a magnetic disc such as a HDD using a magnetic method, an optical disc such as a CD or DVD using an optical method and a photomagnetic disc, etc. using a photomagnetic effect are used.

The optical disc using the optical method should have a small bit (recording mark) size and a narrow track width in order to have a high-density recording capacity. However, because a spot size of light collected onto a disc so as to form a bit onto a recording layer thereon is restricted by diffraction limit, there is limit to improve a recording density.

Trends toward large storage in recording medium needs a new optical recording /reproducing method capable of overcoming the limit of the conventional optical recording/ reproducing method. Recently, researches on near field recording/reproducing using a near field capable of improving a recording capacity epochally have increased.

Principals of the near field optical recording/reproducing will be described as follows. In light incident to a lens at an angle not less than a critical angle of the lens, when the light proceeds from an optically dense portion to an optically rare portion in a refractive index, the light is total-reflected. Herein, by the total reflection of the light, light having very low brightness exists on the surface of the lens, it is called an evanescent wave. By using the evanescent wave, it is possible to have high resolving power that could not have in the conventional far field due to absolute limit, namely, diffraction limit occurred by a light diffraction phenomenon.

A near field optical recording/reproducing instrument generates an evanescent wave on the surface of a lens by total-reflecting light in the lens, and accordingly data can be recorded and reproduced by coupling the evanescent wave to a disc.

FIGS. 1 and 2 respectively illustrate a structure of the conventional near field optical recording/reproducing apparatus. Herein, FIG. 1 is a plan view, and FIG. 2 is an enlarged-sectional view of a slider having SIL.

As depicted in FIG. 1, the conventional near field optical recording/reproducing apparatus includes a swing arm 21 installed so as to perform a reciprocating rotation; an actuator 23 for rotationally driving the swing arm 21; and a head 30 installed at the end of the swing arm 21 in order to scan a track of a disc 10 by being lifted above the disc 10 by air dynamic pressure.

As depicted in FIG. 2, the head 30 includes an objective lens 31, an opposed lens 32 separated from the objective lens 31 by a focus distance of the objective lens 31 and a slider 33 for fixing the lenses 31, 32. Herein, it is general to use a solid immersion lens (SIL) as the opposed lens, namely converging lens 32.

In addition, in order to lift the slider 33 above the disc 10, an air bearing system (ABS) 36 for generating air pressure between the disc 10 and the slider 33 is installed at the bottom surface of the slider 33.

In the near field optical recording/reproducing apparatus, while the head 30 in a lifted state by the ABS 36 moves above the rotational disc 10, data is recorded/reproduced onto the disc 10.

In the meantime, when the head 30 in a lifted state by the ABS 36 moves above the rotational disc 10, because of the ABS 36 installed at the both sides of the opposed lens 32, the bottom surface of the slider 33 has not to escape from the inner or outer circumference of a recording capable region of the disc 10, and accordingly there are regions incapable of recording/reproducing on the inner or outer circumference of the disc 10.

In particular, according to miniaturization of a portable terminal, etc. using a recording/reproducing apparatus, it is required for a disc as a recording medium to have a small size and a high capacity, and accordingly existence of regions incapable of recording/reproducing is big restriction in increasing of a recording capacity of a disc.

SUMMARY OF THE INVENTION

In order to solve the above-mentioned problem, it is an object of the present invention to provide a head of an optical recording/reproducing apparatus which is capable of increasing recordable region on the inner or outer circumference of a disc.

In order to achieve the above-mentioned object, a head of an optical recording/reproducing apparatus in accordance with the present invention includes a slider at which an objective lens is installed at a top surface of the slider and a solid immersion lens (SIL) installation hole formed below the objective lens penetrates toward a bottom surface of the slider in order to install a SIL; a flying means fixedly installed around the SIL installation hole at the bottom surface of the slider in order to lift the slider above an optical recording medium; wherein a sectional area of the slider parallel to a surface of the optical recording medium increases from the bottom surface to the top surface of the slider.

In addition, an optical recording/reproducing apparatus in accordance with the present invention includes a slider at which an objective lens is installed at a top surface of the slider and a solid immersion lens (SIL) installation hole formed below the objective lens penetrates toward to the bottom surface of the slider in order to install a SIL; a flying means fixedly installed around the SIL installation hole at the bottom surface of the slider in order to lift the slider above an optical recording medium; wherein a sectional area of the slider parallel to a surface of the optical recording medium increases from the bottom surface to the top surface.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the preferred embodiment of the present invention will be described.

Figure 1:
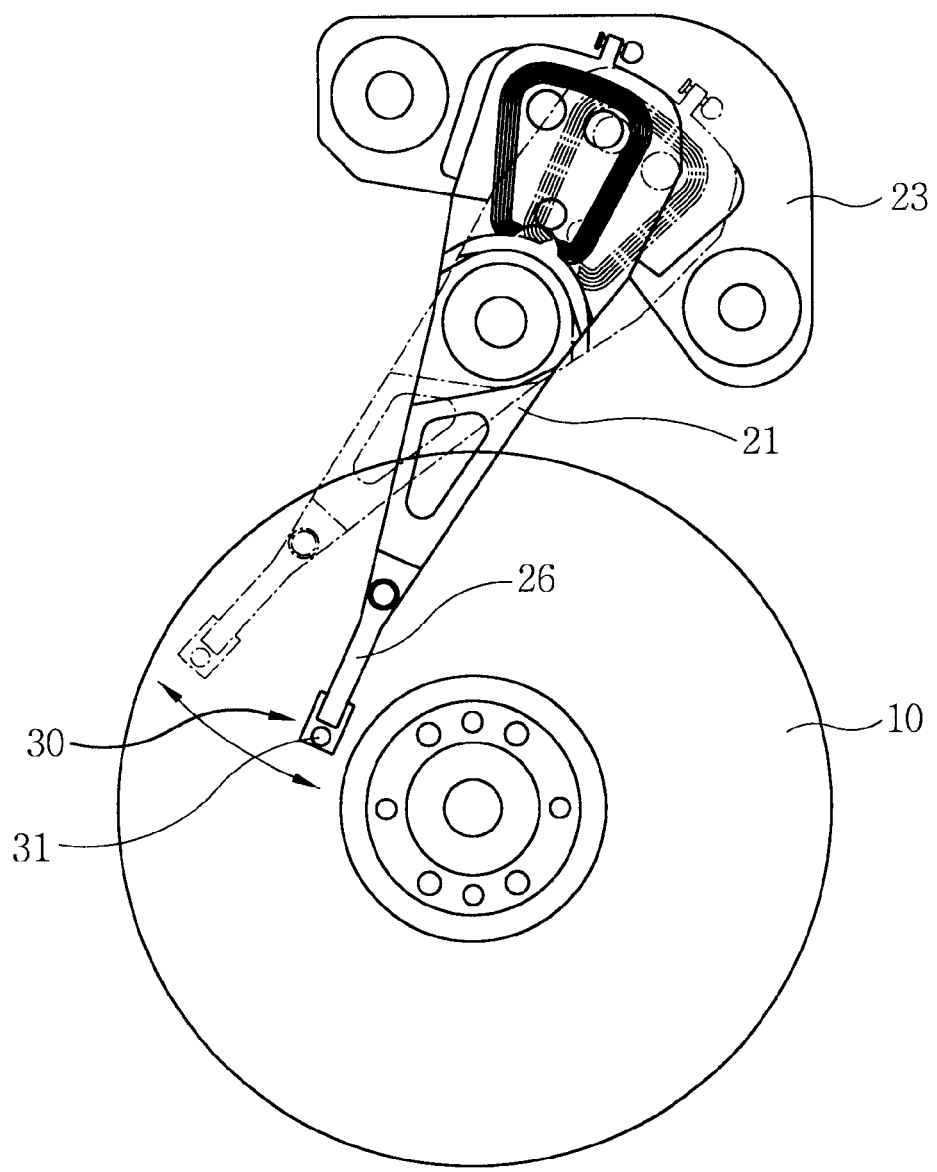
FIG. 1 is a plan view illustrating the conventional near field optical recording/reproducing apparatus.
Figure 2:
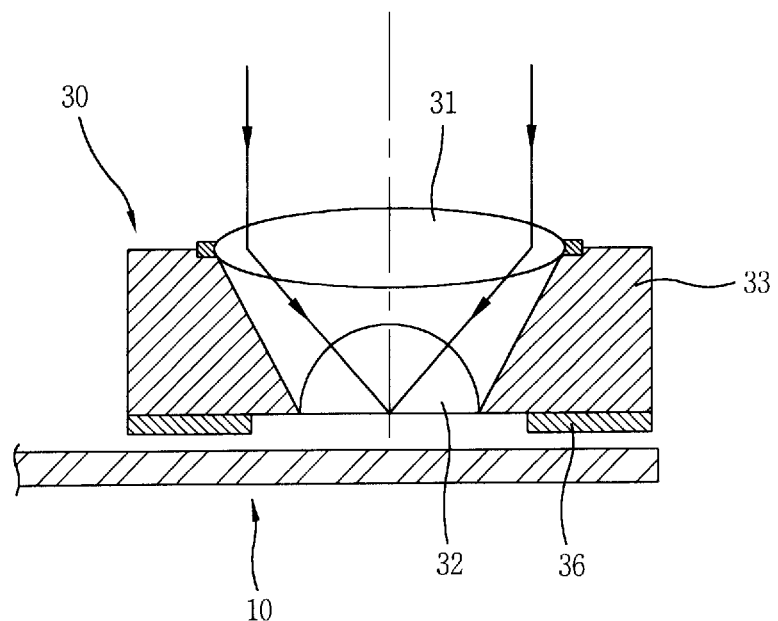
FIG. 2 is an enlarged-sectional view illustrating a head of the conventional near field optical recording/reproducing apparatus in FIG. 1.
Figure 3:
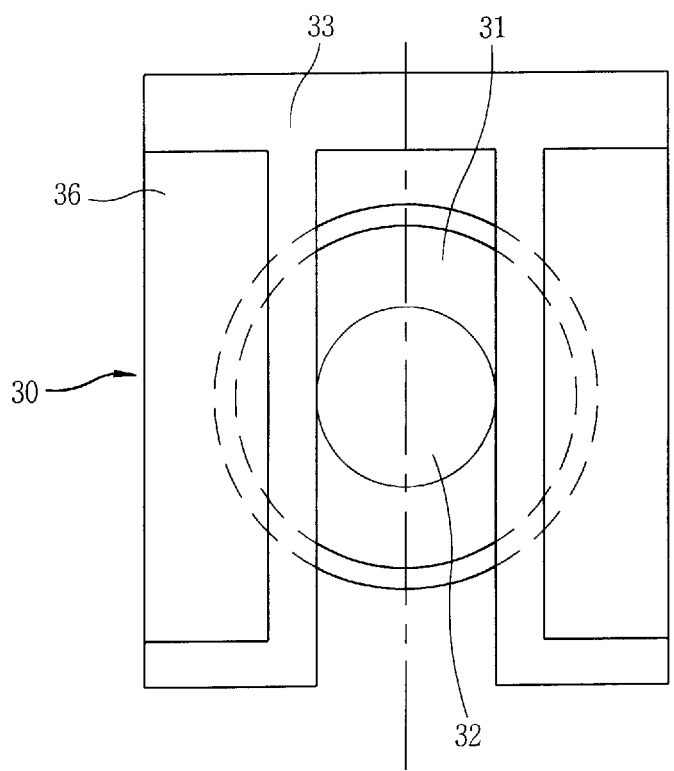
FIG. 3 is a bottom view illustrating the bottom surface of the head in FIG. 1.
Figure 4:
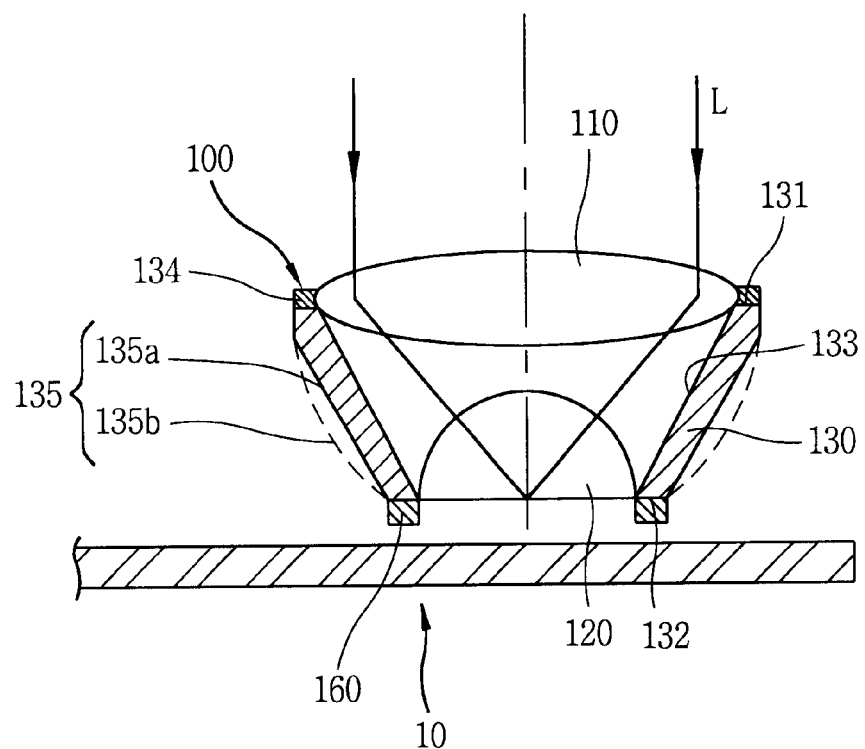
FIG. 4 is a sectional view illustrating an example of a head of an optical recording/reproducing apparatus in accordance with the present invention.

FIG. 4 is a sectional view illustrating an example of a head of an optical recording/reproducing apparatus in accordance with the present invention.

As depicted in FIG. 4, a head 100 of the optical recording/reproducing apparatus in accordance with the present invention includes an objective lens 110, a solid immersion lens (SIL) 120 installed to be identical with an optical axis of the objective lens 110, a slider 130 at which the objective lens 110 is installed at a top surface 131 and a SIL installation hole 133 form below the objective lens 110 penetrating toward a bottom surface 132 of the slider 130 in order to install the SIL 120; and a flying means 160 fixedly installed around the SIL installation hole 133 at the bottom surface 132 of the slider 130 in order to lift the slider 130 above an optical recording medium.

The optical recording medium is a disc 10 capable of recording/reproducing data by being rotated by a spindle motor (not shown) at high speed.

The objective lens 110 is installed at an objective lens installation portion 134 formed at the top surface 131 of the slider 130.

As depicted in FIG. 4, the slider 130 has a 'V'-shaped section in a direction of an optical axis of the objective lens 110, in more detail, a sectional area of the slider 130 parallel to a surface of the disc 10 increases from the bottom surface 132 to the top surface 131 of the slider 130.

And, in taking the front view of a side surface 135 of the slider 130, generally the outer circumference 135a is shaped to be flat. However, as a dotted line 135b in FIG. 4, the outer circumference 135a may be formed to be convex.

Figure 5A:
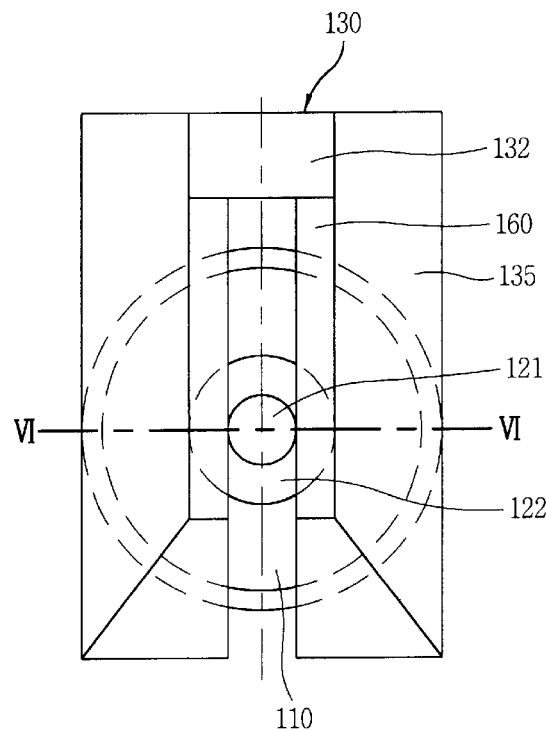
FIGS. 5A and 5B are bottom views respectively illustrating the bottom surface of the head in FIG. 4.
Figure 5B:
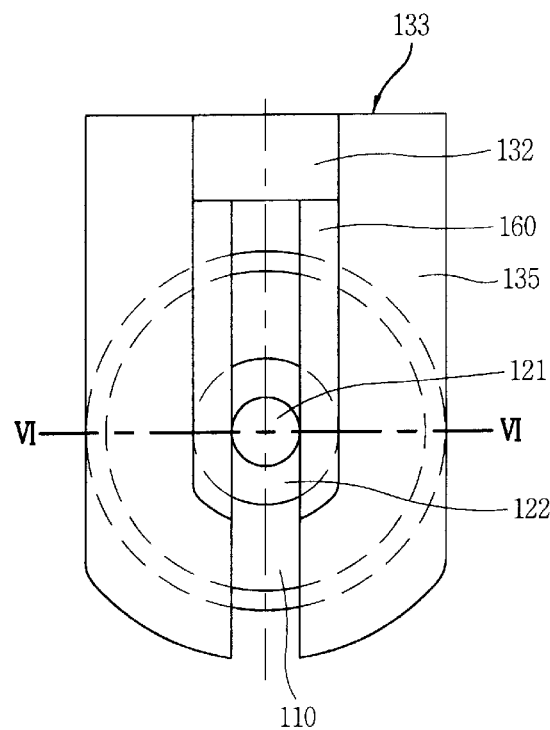

In the meantime, as depicted in FIG. 5A, the top surface 131 and the bottom surface 132 of the slider 130 respectively have rectangular shapes having a similar figure each other. However, as depicted in FIG. 5B, they can have a semi-circular shape similar to each other.

And, in examples of the head 100, the SIL installation hole 133 at the slider 130 is formed as a groove 136 open at a certain surface of the slider 130. possibly to the front of the slider 130.

Figure 6:
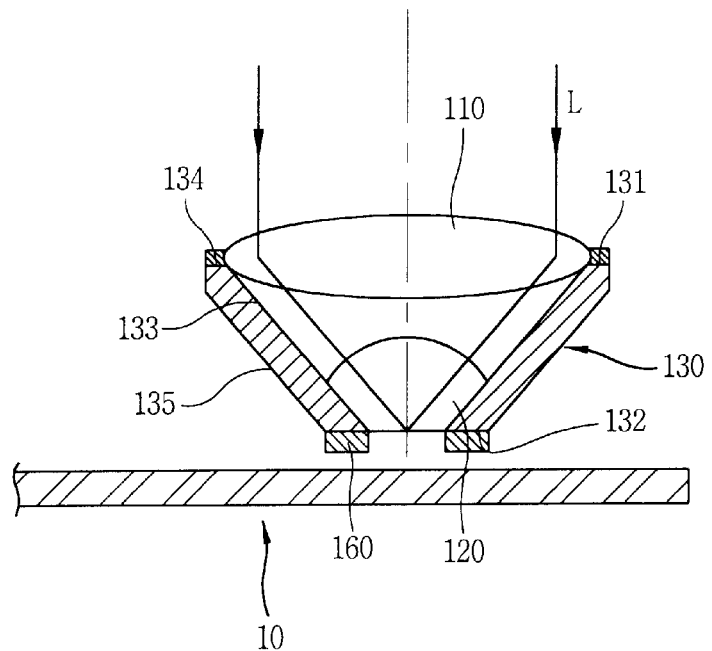
FIG. 6 is a sectional view illustrating another example of a head having a modified SIL of the optical recording/reproducing apparatus in FIG. 4.
Figure 7A:
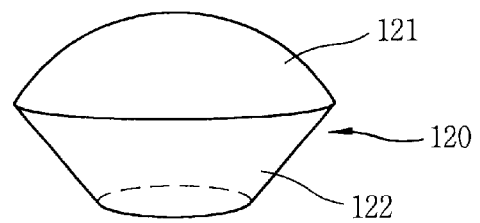
FIGS. 7A and 7B are perspective views illustrating examples of a SIL in FIG. 6.
Figure 7B:
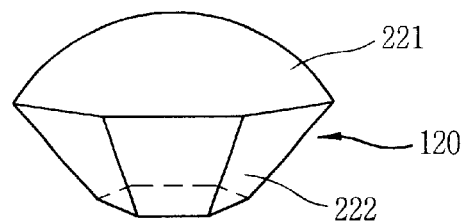

As depicted in FIG. 4, the SIL 120 has a region in which laser beam L does not proceed, because the region in which laser beam L does not proceed is unnecessary part, as depicted in FIGS. 6, 7A and 7B, it is preferable for the SIL 120 to have a first surface 121 or 221 having a partial-spherical shape and a second surface 122 or 222 (as an opposed surface of the first surface 121 or 221) having a truncated or tapered conical shape. In particular, as depicted in FIGS. 7A and 7B, the second surface 122 or 222 can have a conical shape or a pyramid shape.

Herein, part of the inner circumference of the SIL installation hole 133 has a conical/pyramid shape corresponding to the second surface 122, 222 of the SIL 120 so as to install the SIL 120.

And, as depicted in FIGS. 5A and 5B, an air bearing system (ABS) applied to a hard disk drive (HDD), etc. is used as the flying means 160. It is installed at the circumference of the SIL installation hole 133, namely, at both sides in order to lift the slider 130 above the disc 10 so as to make the SIL 120 maintain a certain distance from the disc 10 in a near field region.

As depicted in FIGS. 4 and 6, the head 100 of the optical recording/reproducing apparatus records data onto the disc 10 or reproduces data recorded onto the disc 10 by being lifted above the disc 10 rotating at high speed with a certain distance from the disc 10 and being moved horizontally.

In particular, as depicted in FIG. 7, because the head 100 placed around the outer circumference of the disc 10 can move more outwardly than the conventional head, it is possible to record/reproduce data onto the disc 10 larger amount of data by the increased recordable region due to the increased outwardly/inwardly movable distance on the disc 10. Of course, it is possible to have the same advantage on the inner circumference of the disc 10.

In more detail, in a head 30 of the conventional near field optical recording/reproducing apparatus, because an area of a surface of the head 30 facing the disc 10 is wide, it is impossible to use a certain portion of the inner circumference or outer circumference of the disc 10. However, in the present invention, by decreasing an area of the bottom surface of the slider 33, that problem can be solved.

In the head 100 of the optical recording/reproducing apparatus in accordance with the present invention, by decreasing the bottom area of the bottom surface 132 of the slider 130, it is possible to record/reproduce data onto the inner/outer circumference region of the disc 10, and accordingly an effective or recordable area of the disc 10 is increased.

In the meantime, there are a constant angular velocity (CAV) method and a constant linear velocity (CLV) method as methods for recording data on a disc with an optical recording/reproducing apparatus. In the CAV method, an angular velocity is maintained constant in the rotation of a disc by a spindle motor, in that case, because a linear velocity of the inner portion and the outer portion of the disc differentiates under the same angular velocity, a recordable/reproducable region by a head differentiates according to the inner or outer portion of the disc even for the same time. In more detail, because the head has more contacts with the outer portion than the inner portion of the disc for the same time, the outer portion of the disc has a recording density lower than the inner portion of the disc does.

In the CLV method, in order to record data onto the inner and outer portions of the disc as the same density, when the head records/reproduces the outer portion of the disc, an angular velocity of the spindle motor is decreases in comparison with recording/reproducing in the inner portion of the disc. Because the CLV method can improve a recording density of the disc more in comparison with the CAV method, recently it is widely used.

Accordingly, in the conventional optical recording/reproducing apparatus using a slider having a wider bottom surface, when a disc by the CLV method is used which has a higher outer recording density in comparison with the CAV method, lots of loss in recording density of the disc occur at an outer effective area of the disc.

Accordingly, in the optical recording/reproducing apparatus using the CLV method, because a head of the optical recording/reproducing apparatus in accordance with the present invention can increase recordable region at not only in the inner circumference but also in the outer circumference of a disc, a storing capacity of a recording medium can be increased.

What is claimed is:

1. A head of an optical recording/reproducing apparatus, comprising:

a slider at which an objective lens is installed at a top surface of the slider and a solid immersion lens (SIL) installation hole formed below a bottom of the objective lens penetrates toward a bottom surface of the slider in order to install a SIL;

a flying means fixedly installed around the SIL installation hole at the bottom surface of the slider in order to lift the slider above an optical recording medium;

wherein a sectional area of the slider parallel to a surface of the optical recording medium increases from the bottom surface to the top surface of the slider.

2. The apparatus of claim 1, wherein a side surface of the slider is formed to be convex.

3. The apparatus of claim 1, wherein a side surface of the slider is formed to be flat.

4. The apparatus of claim 1, wherein the objective lens is installed at an objective lens installation portion formed at the top surface of the slider.

5. The apparatus of claim 1, wherein the flying means is an air bearing system.

6. The apparatus of claim 1, wherein the top surface and the bottom surface of the slider respectively have rectangular shapes similar to each other.

7. The apparatus of claim 1, wherein the SIL installation hole is a groove open at a certain side surface of the slider.

8. The apparatus of claim 1, wherein the SIL has a first surface having a partial-spherical shape and a second surface opposite to the first surface having a truncated conical shape.

9. The apparatus of claim 8, wherein the second surface has a pyramid shape.

10. The apparatus of claim 8, wherein an inner circumference of the SIL installation hole has a conical shape corresponding to the second surface of the SIL.

11. The apparatus of claim 1, wherein the SIL has a first surface having a partial-spherical shape and a second surface opposite to the first surface having a tapered conical shape.

12. The apparatus of claim 1, wherein an edge of the bottom surface of the slider has an arc portion in a partial arc shape.

13. The apparatus of claim 12, wherein the edge of the top surface of the slider has an arc portion in a partial arc shape similar to the arc portion of the bottom surface.

14. An optical recording/reproducing apparatus, comprising:

a slider at which an objective lens is installed at a top surface of the slider and a solid immersion lens (SIL) installation hole formed below the objective lens penetrates toward to the bottom surface of the slider in order to install a SIL;

a flying means fixedly installed around the SIL installation hole at the bottom surface of the slider in order to lift the slider above an optical recording medium;

wherein a sectional area of the slider parallel to a surface of the optical recording medium increases from the bottom surface to the top surface.

15. The apparatus of claim 14, wherein the flying means is an air bearing system.

16. The apparatus of claim 14, wherein the top surface and the bottom surface of the slider respectively have rectangular shapes similar to each other.

17. The apparatus of claim 14, wherein the SIL installation hole is a groove open at a certain side surface of the slider.

18. The apparatus of claim 14, wherein the SIL has a first surface having a partial-circular shape and a second surface opposite to the first surface having a truncated conical shape.

19. The apparatus of claim 18, wherein the second surface has a pyramid shape.

20. The apparatus of claim 18, wherein the inner circumference of the SIL installation hole has a conical shape corresponding to the second surface of the SIL.

* * * * *